United States Patent
Ishikawa et al.

(12)

(10) Patent No.: US 12,409,835 B2
(45) Date of Patent: Sep. 9, 2025

(54) VEHICLE CONTROL APPARATUS

(71) Applicant: Honda Motor Co., Ltd., Tokyo (JP)

(72) Inventors: Shota Ishikawa, Wako (JP); Nana Niibo, Wako (JP); Shun Iwasaki, Wako (JP); Takeru Goto, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 350 days.

(21) Appl. No.: 18/078,272

(22) Filed: Dec. 9, 2022

(65) Prior Publication Data

US 2023/0182731 A1 Jun. 15, 2023

(30) Foreign Application Priority Data

Dec. 15, 2021 (JP) .................. 2021-203419

(51) Int. Cl.
*B60W 30/14* (2006.01)
*B60W 30/02* (2012.01)
(Continued)

(52) U.S. Cl.
CPC ........ *B60W 30/143* (2013.01); *B60W 30/025* (2013.01); *B60W 30/12* (2013.01);
(Continued)

(58) Field of Classification Search
CPC ......... B60W 30/143; B60W 30/18159; B60W 30/025; B60W 30/12; B60W 30/16; B60W 30/18163; B60W 40/04; B60W 40/105; B60W 50/0097; B60W 2554/4041; B60W 2554/80; B60W 2720/125

See application file for complete search history.

(56) References Cited

U.S. PATENT DOCUMENTS

2003/0220738 A1* 11/2003 Abe ................... G08G 1/166
340/436
2011/0187515 A1* 8/2011 Saito ................. B60W 30/0956
701/1
(Continued)

FOREIGN PATENT DOCUMENTS

| JP | 2005524135 A | 8/2005 |
| JP | 2020158090 A | 10/2020 |
| WO | 2020208989 A1 | 10/2020 |

OTHER PUBLICATIONS

Japanese office action; Application 2021-203419; Aug. 27, 2024.

*Primary Examiner* — Hussein Elchanti
(74) *Attorney, Agent, or Firm* — Duft & Bornsen, PC

(57) ABSTRACT

A vehicle control apparatus includes a microprocessor configured to perform: recognizing a surrounding situation of a subject vehicle; controlling a traveling actuator so that the subject vehicle travels along a target path generated based on a recognition result; and predicting, when an object is recognized in a current lane or in an adjacent lane, whether a passing run is occur based on a relative speed with the object. The generating includes, when the passing run is predicted to occur, generating the target path so that the subject vehicle executes an offset driving in which the subject vehicle is offset in a vehicle width direction relative to the object, and so that an acceleration of the subject vehicle in the vehicle width direction while shifting to or returning from the offset driving is equal to or less than a predetermined value.

10 Claims, 6 Drawing Sheets

(51) Int. Cl.
  *B60W 30/12* (2020.01)
  *B60W 30/16* (2020.01)
  *B60W 30/18* (2012.01)
  *B60W 40/04* (2006.01)
  *B60W 40/105* (2012.01)
  *B60W 50/00* (2006.01)

(52) U.S. Cl.
  CPC ...... *B60W 30/16* (2013.01); *B60W 30/18159* (2020.02); *B60W 30/18163* (2013.01); *B60W 40/04* (2013.01); *B60W 40/105* (2013.01); *B60W 50/0097* (2013.01); *B60W 2554/4041* (2020.02); *B60W 2554/80* (2020.02); *B60W 2720/125* (2013.01)

(56) References Cited

U.S. PATENT DOCUMENTS

| | | | | |
|---|---|---|---|---|
| 2017/0151982 A1* | 6/2017 | Fujii | .................... | G06V 20/588 |
| 2019/0086917 A1* | 3/2019 | Okimoto | ................ | B60K 28/06 |
| 2019/0351899 A1* | 11/2019 | Adam | .................... | B60W 30/09 |
| 2020/0148205 A1* | 5/2020 | Yoshida | ................ | B60W 60/00 |
| 2020/0307595 A1* | 10/2020 | Kato | .................... | B60W 10/30 |
| 2021/0237779 A1* | 8/2021 | Das | ...................... | G08G 1/0129 |
| 2022/0024314 A1* | 1/2022 | Yagyu | .................... | B60K 35/81 |

* cited by examiner

VEHICLE CONTROL APPARATUS

CROSS-REFERENCE TO RELATED APPLICATION

This application is based upon and claims the benefit of priority from Japanese Patent Application No. 2021-203419 filed on Dec. 15, 2021, the content of which are incorporated herein by reference.

BACKGROUND OF THE INVENTION

Field of the Invention

This invention relates to a vehicle control apparatus for controlling a traveling of a vehicle.

Description of the Related Art

As an apparatus of this type, an apparatus is known that measures the position of an adjacent vehicle traveling in an adjacent lane adjacent to a lane on which a subject vehicle travels and changes a position of the subject vehicle in a lane width direction according to a measurement result (see, for example, JP 2005-524135 A).

However, when the traveling position of the subject vehicle is simply changed according to the position of the adjacent vehicle, as in the apparatus described in JP 2005-524135 A, the occupant may feel discomfort and the ride comfort of the occupant may be deteriorated.

SUMMARY OF THE INVENTION

An aspect of the present invention is a vehicle control apparatus including a microprocessor and a memory coupled to the microprocessor. The microprocessor is configured to perform: recognizing a surrounding situation of a subject vehicle; generating a target path based on a recognition result in the recognizing; controlling a traveling actuator so that the subject vehicle travels along the target path; and predicting, when an object is recognized in a current lane in which the subject vehicle is traveling or in an adjacent lane adjacent to the current lane in the recognizing, whether a passing run, in which either the subject vehicle or the object passes by a side of the object, is occur based on a relative speed with the object. The microprocessor is configured to perform the generating including, when the passing run is predicted to occur in the predicting, generating the target path so that the subject vehicle executes an offset driving in which the subject vehicle is offset in a vehicle width direction relative to the object, and so that an acceleration of the subject vehicle in the vehicle width direction while shifting to or returning from the offset driving is equal to or less than a predetermined value.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1A to 8B. The vehicle control apparatus according to the embodiment of the present invention can be applied to a vehicle having a self-driving capability, that is, a self-driving vehicle. A vehicle to which the vehicle control apparatus according to the present embodiment is applied may be referred to as a subject vehicle to be distinguished from other vehicles. The subject vehicle may be any of an engine vehicle having an internal combustion (engine) as a traveling drive source, an electric vehicle having a traveling motor as a traveling drive source, and a hybrid vehicle having an engine and a traveling motor as traveling drive sources. The subject vehicle can travel not only in a self-drive mode in which driving operation by a driver is unnecessary, but also in a manual drive mode with driving operation by the driver.

Figure 1A:
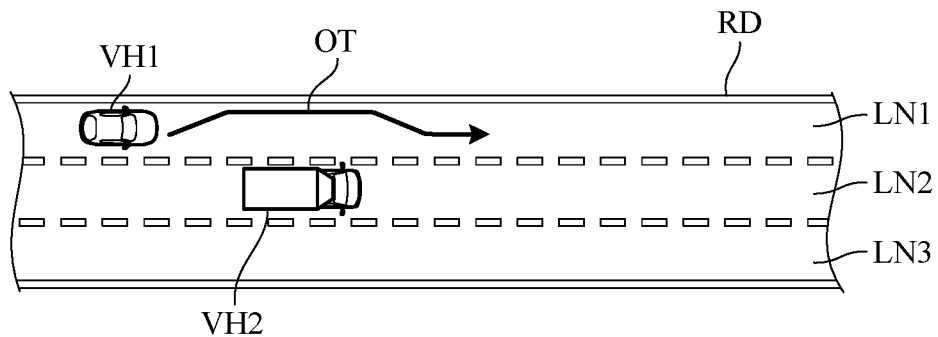
FIG. 1A is a diagram showing an example of a traveling scene of a vehicle.
Figure 1B:
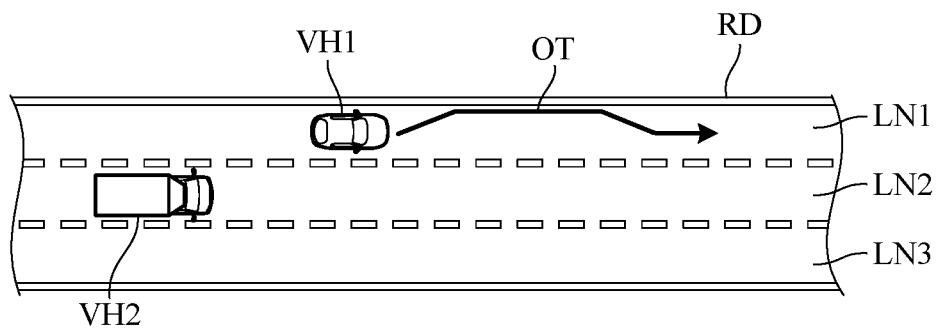
FIG. 1B is a diagram showing another example of a traveling scene of a vehicle.

FIGS. 1A and 1B illustrate an example of a traveling scene of a vehicle. FIG. 1A illustrates a state when a vehicle VH1, which is traveling on the leftmost lane LN1 of a left-hand side road RD with three lanes on each side at a vehicle speed V11, passes by a side of a vehicle VH2, which is traveling in a center lane LN2 at a vehicle speed V12 (<V11). The vehicle VH1 is traveling in the self-drive mode, and the vehicle VH2 is traveling in the manual drive mode.

In FIG. 1A, when the vehicle VH1 traveling in the self-drive mode passes by the side of the vehicle VH2, the vehicle VH1 offsets its driving path to the left so that the distance in the vehicle width direction from the vehicle VH2 is at least a predetermined length, so as to reduce the feeling of pressure on the occupant due to the approach of the vehicle VH2. After passing by the side of the vehicle VH2, the vehicle VH1 returns the driving path to the position before the offset (center of the lane). At this time, if the driving path of the vehicle VH1 is rapidly changed toward the center of the lane, the occupant may misunderstand that the vehicle VH1 is about to change lanes to the lane LN2.

The arrow line OT in the figure represents an offset driving path (hereafter referred to as offset driving path) of the vehicle VH1.

FIG. 1B illustrates a state when the vehicle VH2, which is traveling in the lane LN2 of the road RD at a vehicle speed V22, passes by the side of the vehicle VH1, which is traveling in the lane LN1 at a speed V21 (<V22). In FIG. 1B, when the vehicle VH1 traveling in the self-drive mode recognizes the vehicle VH2 approaching from behind, the vehicle VH1 offsets the driving path of the vehicle VH1 to the left so that the distance in the vehicle width direction from the vehicle VH2 is at least a predetermined length to reduce the feeling of pressure to the occupant due to the approach of the vehicle VH2. At this time, in a case where the occupant is not aware of the vehicle VH2 approaching from behind, the occupant may not understand why the vehicle VH1 is offsetting the driving path of the vehicle VH1 and may feel discomfort.

As described above, if the driving path of the vehicle VH1 is offset when the vehicle VH1 passes by the side of the vehicle VH2 or when the vehicle VH2 passes by the side of the vehicle VH1, the occupant may feel discomfort and the ride comfort of the occupant may be deteriorated depending on the degree of change in the driving path. Therefore, the vehicle control apparatus in the present embodiment is configured as follows.

Figure 2:
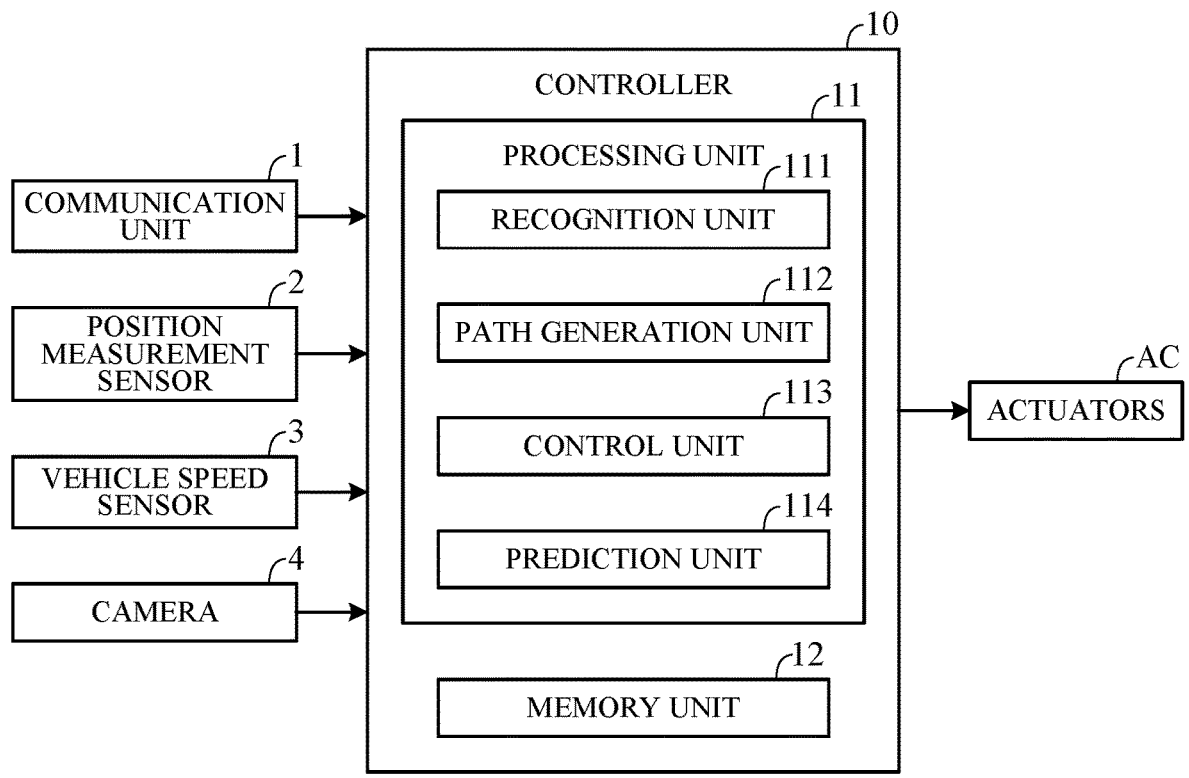
FIG. 2 is a block diagram schematically illustrating main configuration of a vehicle control apparatus according to an embodiment of the present invention.

FIG. 2 is a block diagram schematically illustrating main configuration of a vehicle control apparatus 100 according to the embodiment of the present invention. As illustrated in FIG. 2, the vehicle control apparatus 100 includes a controller 10, a communication unit 1, a positioning measurement sensor 2, a vehicle speed sensor 3, a camera 4, and actuators AC, which are each communicatively connected to the controller 10.

The communication unit 1 communicates with various devices (not illustrated) via a network including a wireless communication network represented by the Internet network, a mobile phone network, or the like, and acquires map information, traffic information, and the like periodically or at an arbitrary timing. The network includes not only public wireless communication networks, but also closed communication networks established for each given administrative region, such as wireless LAN, Wi-Fi (registered trademark), and Bluetooth (registered trademark).

The positioning measurement sensor 2 receives a positioning signal transmitted from a positioning satellite. The positioning satellite is an artificial satellite such as a global positioning system (GPS) satellite or a quasi-zenith satellite. The positioning information received by the positioning measurement sensor 2 is used to measure the current position (latitude, longitude, and altitude) of the subject vehicle. The positioning measurement sensor 2 is used to detect the position of the subject vehicle. Therefore, a distance detection unit (for example, a radar or LiDAR) that detects the distance from the subject vehicle to an object (object on the road) may be used instead of the positioning measurement sensor 2. In this case, the position of the subject vehicle is detected based on the position information of the object on the road obtained from the map information stored in a memory unit 12 and the information on distance to the object obtained by the positioning measurement sensor 2. The positioning measurement sensor 2 may be a combination of a receiver for positioning signals and a distance detection unit. The vehicle speed sensor 3 detects the vehicle speed of the subject vehicle.

The camera 4 includes an imaging device (image sensor) such as a CCD or a CMOS. The camera 4 may be a monocular camera or a stereo camera. The camera 4 captures images of the surroundings of the subject vehicle. The camera 4 is attached to, for example, at a predetermined position (front part or rear part) of the subject vehicle, and continuously captures images of the space around the subject vehicle to acquire image data of the object (hereinafter referred to as captured image data or simply a captured image).

The actuators AC is traveling actuators for controlling traveling of the subject vehicle. In a case where the traveling drive source is an engine, the actuators AC includes a throttle actuator that adjusts an opening (throttle opening) of a throttle valve of the engine. In a case where the traveling drive source is a traveling motor, the traveling motor is included in the actuators AC. The actuators AC also includes a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), a memory unit 12 such as a ROM and a RAM, and other peripheral circuits (not illustrated) such as an I/O interface. Although a plurality of ECUs having different functions such as an engine control ECU, a traveling motor control ECU, and a braking device ECU may be separately provided, in FIG. 2, the controller 10 is illustrated as a set of these ECUs for convenience.

The memory unit 12 stores highly accurate detailed map information (referred to as a high-precision map). The high-precision map information includes road position information, information of a road shape (curvature or the like), information of a road gradient, position information of an intersection or a branch point, information of the number of lanes, speed limit, width of a lane and position information for each lane (information of a center position of a lane or a boundary line of a lane position), position information of landmarks (traffic lights, buildings, etc.) as marks on a map, information on road signs (position, type, regulation information, etc.), and information of a road surface profile such as unevenness of a road surface. The memory unit 12 also stores information such as various control programs and thresholds used in the programs.

The processing unit 11 includes, as its functional configuration, a recognition unit 111, a path generation unit 112, a control unit 113, and a prediction unit 114.

The recognition unit 111 recognizes the surrounding situation of the subject vehicle based on the image captured by the camera 4.

When the recognition unit 111 recognizes other vehicle within the lane in which the subject vehicle is traveling (hereinafter referred to as current lane) or within a lane adjacent to the subject lane and in the same traveling direction (hereinafter referred to as adjacent lane), the prediction unit 114 calculates the relative speed of the subject vehicle with the other vehicle, more specifically, the relative speed in the traveling direction, based on the traveling speed of the subject vehicle 101 detected by the vehicle speed sensor 3 and the traveling speed of the other vehicle recognized by the recognition unit 111. Based on the relative speed with the other vehicle, the prediction unit 114 predicts whether or not a passing run will occur in which one of the subject vehicle and the other vehicle passes by the side of the other vehicle.

The path generation unit 112 generates a target path on the basis of the recognition result of the recognition unit 111. When the prediction unit 114 predicts that there will be a passing run, the path generation unit 112 generates a target path so that the subject vehicle executes offset driving in which the subject vehicle is offset in the vehicle width direction relative to other vehicle, and so that the acceleration of the subject vehicle in the vehicle width direction while shifting to or returning from the offset driving will be equal to or less than a predetermined value. This predetermined value is a value smaller than a difference threshold at which the occupant can detect lateral shift of the vehicle (shift in the vehicle width direction), and is set in advance based on the result of, for example, sensory evaluation.

Hereinafter, the driving path (target path) of the portion of the offset driving path that is shifting to offset driving is referred to as an offset start path or simply a start path. The driving path during offset driving, that is, when the offset driving is continued, is referred to as an offset continuation path or simply a continuation path. Furthermore, the driving path when returning from the offset driving is referred to as an offset return path or simply a return path.

When the prediction unit 114 predicts that the subject vehicle will pass by the side of the other vehicle from behind, the path generation unit 112 generates a target path so that the acceleration in the vehicle width direction when the subject vehicle returns from offset driving is equal to or less than a predetermined value. On the other hand, when the prediction unit 114 predicts that there will be a passing run in which the other vehicle passes by the side of the subject vehicle from behind, the path generation unit 112 generates a target path so that the acceleration in the vehicle width direction when the subject vehicle shifts to offset driving is equal to or less than the predetermined value.

The control unit 113 controls the actuators AC so that the subject vehicle travels along the target path.

Figure 3:
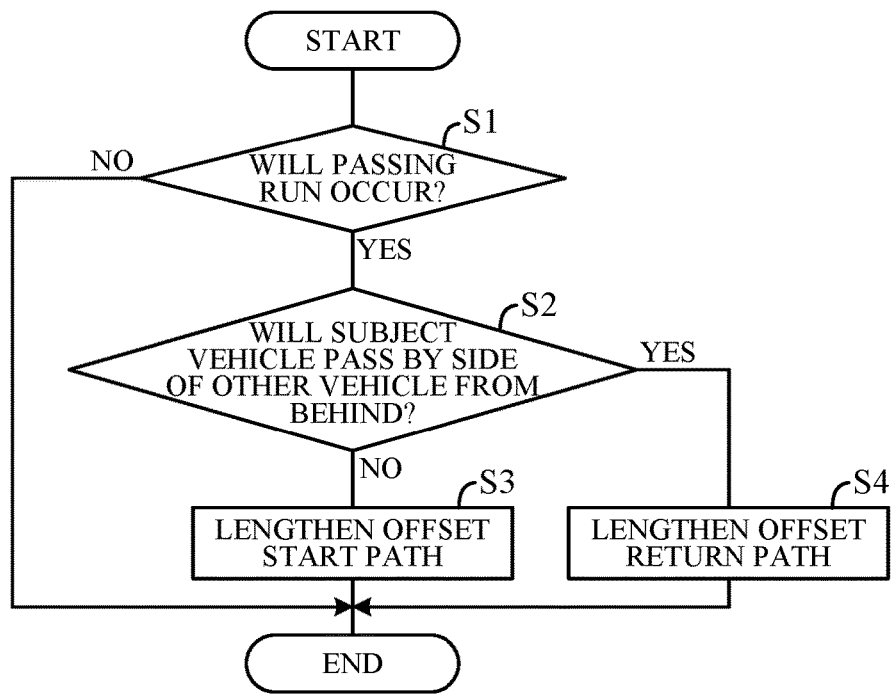
FIG. 3 a flowchart illustrating an example of processing executed by the controller in FIG. 2.

FIG. 3 is a flowchart illustrating an example of processing executed by the controller 10 in FIG. 2. The processing in the flowchart is executed, for example, at a predetermined cycle while the subject vehicle is traveling in the self-drive mode.

As illustrated in FIG. 3, first, in step S1, when the other vehicle is recognized in the current lane or in the adjacent lane based on the surrounding situation of the subject vehicle recognized by the recognition unit 111, it is predicted whether or not a passing run will occur based on the relative speed with the other vehicle.

If NO in step S1, the processing ends. If YES in step S1, in step S2, it is determined whether the passing run predicted in step S1 is a passing run in which the subject vehicle passes by the side of the other vehicle from behind. If NO in step S2, that is, when the passing run predicted in step S1 is a passing run in which the other vehicle passes by the side of the subject vehicle from behind, the target path is generated in step S3 so as to lengthen the offset start path. More specifically, the target path is generated such that the acceleration in the vehicle width direction of the subject vehicle when shifting to the offset driving is equal to or less than a predetermined value.

If YES in step S2, that is, when the passing run predicted in step S1 is a passing run in which the subject vehicle passes by the side of the other vehicle from behind, the target path is generated in step S4 so that the offset return path is lengthened. More specifically, the target path is generated such that the acceleration in the vehicle width direction of the subject vehicle when returning from the offset driving is equal to or less than a predetermined value.

Figure 4A:
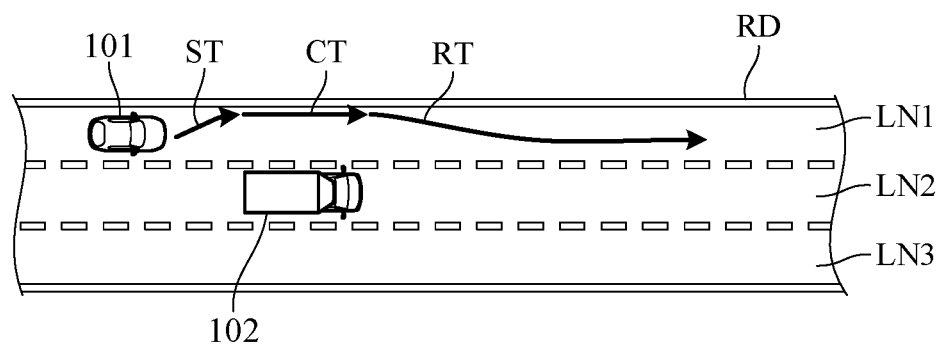
FIG. 4A is a diagram showing an example of an offset driving path generated by the processing in FIG. 3.
Figure 4B:
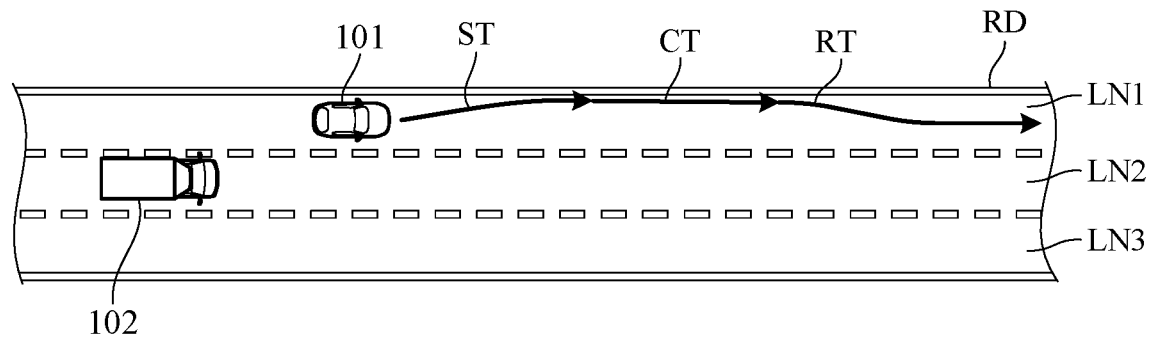
FIG. 4B is a diagram showing another example of the offset driving path generated by the processing in FIG. 3.

FIGS. 4A and 4B illustrate an example of an offset driving path generated by the processing in FIG. 3. As illustrated in FIG. 4A, in a case where the vehicle (subject vehicle) 101 to which the vehicle control apparatus 100 is applied passes by the side of the other vehicle 102 from behind, an offset return path RT is generated so that the acceleration in the vehicle width direction when the subject vehicle 101 returns from offset driving is equal to or less than a predetermined value. On the other hand, as illustrated in FIG. 4B, in a case where the other vehicle 102 passes by the side of the subject vehicle 101 from behind, an offset start path ST is generated so that the acceleration in the vehicle width direction when the subject vehicle 101 shifts to offset driving is equal to or less than a predetermined value. If the subject vehicle 101 is shifted laterally at an acceleration (acceleration in the vehicle width direction) that the occupant does not notice when shifting to offset driving, and then after the other vehicle 102 passes, the subject vehicle 101 is shifted laterally to the position before the offset at an acceleration (acceleration in the vehicle width direction) greater than the occupant notices, the occupant may feel discomfort or anxiety. Therefore, when the other vehicle 102 passes by the side of the subject vehicle 101 from behind, the offset start path ST as well as the offset return path RT are generated so that the acceleration of the subject vehicle 101 in the vehicle width direction is equal to or less than a predetermined value.

Meanwhile, even in traveling scenes other than those illustrated in FIGS. 4A and 4B, the occupant of the subject vehicle 101 may feel discomfort when shifting to or returning from offset driving. These traveling scenes are described below with reference to FIGS. 5 to 8B.

Figure 5:
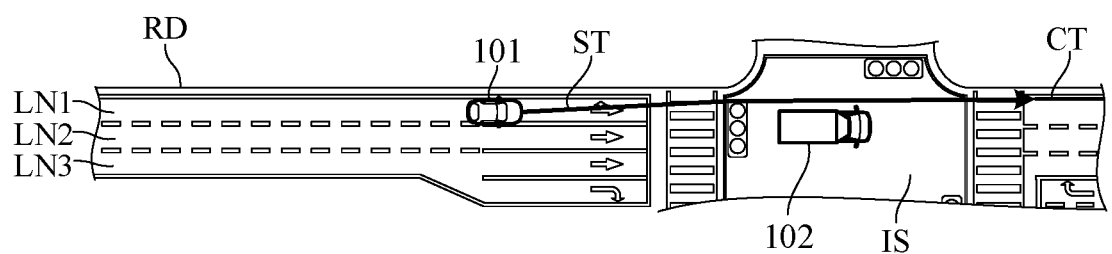
FIG. 5 is a diagram showing an example of a traveling scene when an offset start path goes across an intersection.
Figure 6:
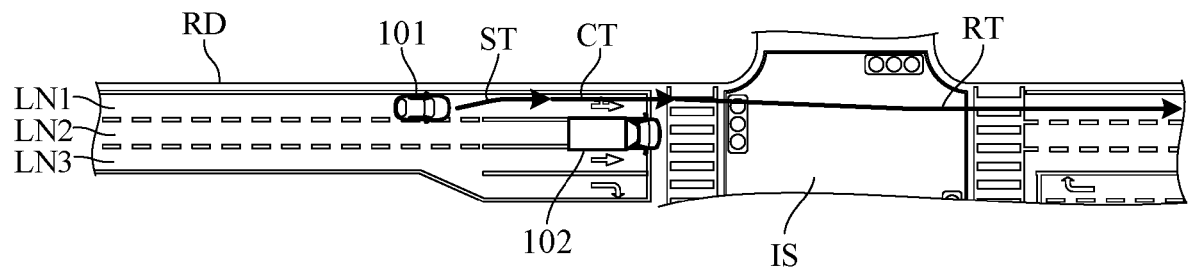
FIG. 6 is a diagram showing an example of a traveling scene where an offset return path goes across an intersection.

FIG. 5 illustrates an example of a traveling scene when the offset start path goes across an intersection. FIG. 6 illustrates an example of a traveling scene where the offset return path goes across an intersection. Since there is no division line at the intersection, if the driving path of the subject vehicle 101 is offset within the intersection, the occupant may not know which direction the subject vehicle 101 is traveling, and may feel anxiety. Therefore, when the offset driving path goes across an intersection, the path generation unit 112 generates a target path so that the acceleration of the subject vehicle 101 in the vehicle width direction within the intersection is equal to or less than a predetermined value.

More specifically, when the offset return path RT goes across an intersection, the path generation unit 112 generates the offset return path RT so that the acceleration of the subject vehicle 101 in the vehicle width direction when returning from offset driving is equal to or less than a predetermined value, as illustrated in FIG. 6. When the offset start path ST goes across an intersection, as illustrated in FIG. 5, the path generation unit 112 generates the offset start path ST so that the acceleration of the subject vehicle 101 in the vehicle width direction when shifting to offset driving is equal to or less than a predetermined value.

Figure 7A:
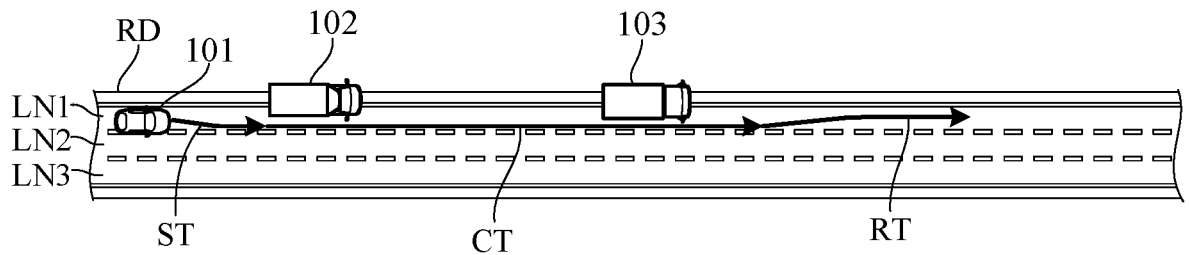
FIG. 7A is a diagram showing an example of a traveling scene where a plurality of vehicles to be avoided are present.

FIG. 7A illustrates an example of a traveling scene where a plurality of vehicles or the like to be avoided by offset driving (hereinafter referred to as avoidance targets) exist. FIG. 7A illustrates a traveling scene in which there are the other vehicle (parked vehicle) 102 that is an avoidance target within the current lane LN1 and another vehicle (parked vehicle) 103 that is an avoidance target in front of the other vehicle (parked vehicle) 102, and furthermore, the offset directions of the subject vehicle 101 to the avoidance targets are the same. In the traveling scene in FIG. 7A, if the subject vehicle 101 passes by the side of the other vehicle 102 and then starts offset driving to avoid the other vehicle 103 after once returning from offset driving, a driving path that can make the subject vehicle 101 wobble may be generated.

Therefore, in the traveling scene illustrated in FIG. 7A, the path generation unit 112 lengthens the offset continuation path CT so that the offset driving continues until the subject vehicle 101 passes by the side of the other vehicle 103. This prevents the generation of a driving path that causes the subject vehicle 101 to wobble.

Figure 7B:
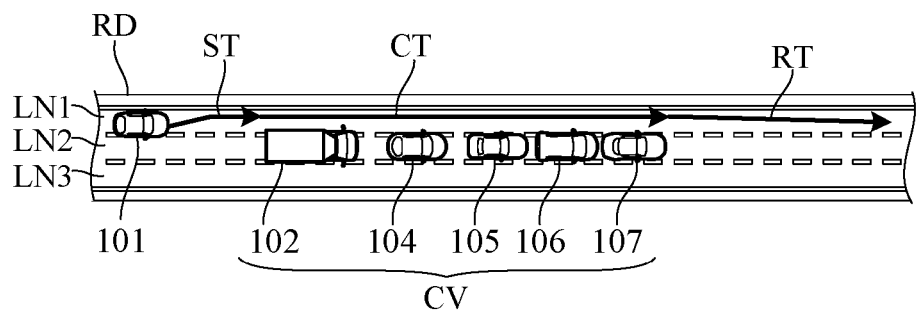
FIG. 7B is a diagram showing an example of a traveling scene in which a plurality of vehicles to be avoided are consecutively present.

FIG. 7B illustrates an example of a traveling scene in which avoidance targets are consecutively present. In FIG. 7B, other vehicles 102, 104, 105, and 106 are traveling in a series behind other vehicle 107, which is traveling at a low speed. In the traveling scene in FIG. 7B, if the subject vehicle 101 passes by the side of the other vehicle 102 and then tries to return the driving path to the center of the lane to recover from offset driving, the subject vehicle 101 approaches the lined vehicles CV, which may cause anxiety to the occupant of the subject vehicle 101. In addition, if offset driving is executed individually for each avoidance target, a driving path that causes the subject vehicle 101 to wobble may be generated.

Therefore, in the traveling scene illustrated in FIG. 7B, the path generation unit 112 lengthens the offset continuation path CT so that the offset driving continues until the subject vehicle 101 passes by the lined vehicles CV By executing the offset driving for the lined vehicles CV in this manner, approach of the subject vehicle 101 to the lined vehicles CV during the offset driving is prevented, which reduces anxiety to the occupant. This also prevents the generation of a driving path that causes the subject vehicle 101 to wobble.

Figure 7C:
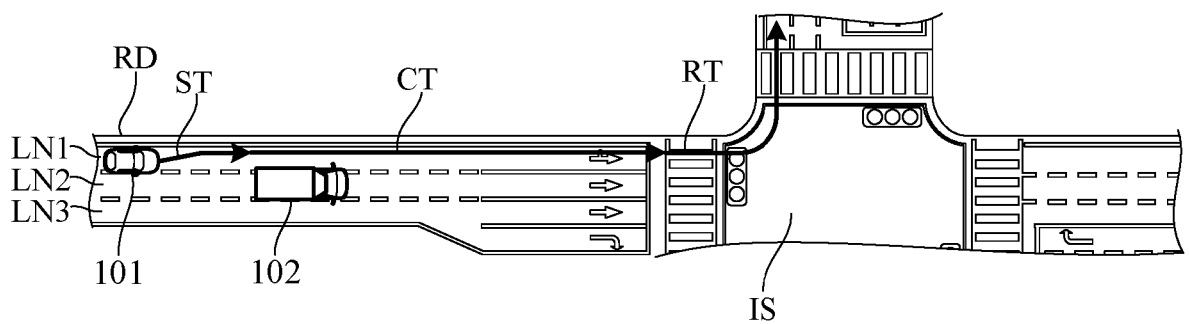
FIG. 7C is a diagram showing an example of a traveling scene in which a vehicle turns around an intersection in an offset direction.

FIG. 7C illustrates an example of a traveling scene in which the subject vehicle 101 turns around an intersection IS in the offset direction. FIG. 7C illustrates a traveling scene in which the subject vehicle 101 turns left at the intersection IS after offsetting its driving path to the left (upper side of the figure) to avoid the other vehicle 102. When turning left at the intersection IS, the subject vehicle 101 needs to travel close to the left end of the lane LN1 according to the Road Traffic Law. Therefore, in FIG. 7C, if the driving path is returned to the center of the lane to recover from offset driving after the subject vehicle 101 passes by the side of the other vehicle 102, a traveling path that causes the subject vehicle 101 to wobble may be generated.

Therefore, in the traveling scene illustrated in FIG. 7C, the path generation unit 112 lengthens the offset continuation path CT so that the offset driving continues until the subject vehicle 101 enters the intersection IS. This prevents the generation of driving paths such as those described above, which can occur when turning around an intersection in the same direction as the offset direction, that is, driving paths that cause the subject vehicle 101 to wobble.

The present embodiment can achieve advantageous effects as follows.

(1) A vehicle control apparatus 100 includes a recognition unit 111 that recognizes the surrounding situation of the subject vehicle 101, a path generation unit 112 that generates a target path based on the recognition result of the recognition unit 111, a control unit 113 that controls the traveling actuators AC so that the subject vehicle 101 travels along the target path, and a prediction unit 114 that predicts, based on the relative speed with the other vehicle 102, whether or not a passing run, in which either the subject vehicle 101 or the other vehicle 102 passes by the side of the other one, will occur when the other vehicle 102 is recognized in the current lane or in an adjacent lane adjacent to the current lane by the recognition unit 111. When the prediction unit 114 predicts that a passing run will occur, the path generation unit 112 generates a target path so that the subject vehicle 101 executes offset driving in which the subject vehicle is offset in the vehicle width direction relative to other vehicle 102, and so that the acceleration of the subject vehicle in the vehicle width direction while shifting to or returning from the offset driving is equal to or less than a predetermined value. The predetermined value is set to a value smaller than the difference threshold at which the occupant can sense the movement of the subject vehicle 101 in the vehicle width direction. This allows avoidance of approach to the other vehicle in the vehicle width direction without reducing the ride comfort of the occupant. This can also prevent contact with the other vehicle and improve traffic safety. Furthermore, by applying the above embodiment to public transportation, buses and other vehicles can travel smoothly along routes, and user convenience can be improved.

(2) When the prediction unit 114 predicts that a passing run, in which the subject vehicle 101 passes by the side of the other vehicle 102 from behind, will occur, the path generation unit 112 generates a target path so that the acceleration in the vehicle width direction when the subject vehicle 101 returns from the offset driving is equal to or less than the predetermined value. In addition, when the prediction unit 114 predicts that a passing run, in which the other vehicle 102 passes by the side of the subject vehicle 101 from behind, will occur, the path generation unit 112 generates a target path so that the acceleration in the vehicle width direction when the subject vehicle 101 shifts to and returns from the offset driving is equal to or less than the predetermined value. This allows the vehicle to shift to and return from the offset driving with a movement amount that is not noticed by the occupant, which can reduce the discomfort of the occupant due to the lateral shift of the subject vehicle 101.

(3) The prediction unit 114 further predicts whether or not the subject vehicle 101 will enter an intersection when the subject vehicle 101 is returning from the offset driving. When the prediction unit 114 predicts that the subject vehicle 101 will enter an intersection when the subject vehicle 101 is returning from the offset driving, the path generation unit 112 generates a target path so that the acceleration in the vehicle width direction when the subject vehicle 101 returns from the offset driving is equal to or less than the predetermined value. Further, the prediction unit 114 predicts whether or not the subject vehicle 101 will enter an intersection when the subject vehicle 101 is shifting to the offset driving. When the prediction unit 114 predicts that the subject vehicle 101 will enter an intersection when the subject vehicle 101 is shifting to the offset driving, the path generation unit 112 generates a target path so that the acceleration in the vehicle width direction when the subject vehicle 101 shifts to the offset driving is equal to or less than the predetermined value. This reduces the discomfort to the occupant that can occur when an offset start path or offset return path goes across an intersection with no division line.

(4) The prediction unit 114 further predicts whether or not the subject vehicle 101 will enter an intersection during the offset driving and turn at the intersection in the same direction as the offset direction of the offset driving. When the prediction unit 114 predicts that the subject vehicle 101 will turn at the intersection in the same direction as the offset direction of the offset driving, the path generation unit 112 generates a target path so that the offset driving continues to the intersection. This prevents the generation of the driving path such as those described above, which can occur when turning around an intersection in the same direction as the offset direction, that is, driving paths that cause the subject vehicle 101 to wobble.

The above embodiment can be modified into various forms. Some modifications will be described below. In the above embodiment, the camera 4 is used to capture images of the surroundings of the subject vehicle 101, but any configuration of in-vehicle detection unit may be used as long as the in-vehicle detection unit detects the surrounding situation of the subject vehicle 101. For example, the in-vehicle detection unit may be a radar or LiDAR. In the above embodiment, the surrounding situation of the subject vehicle 101 is recognized based on the captured images obtained by the camera 4, but the configuration of recognition unit is not limited to those described above. The recognition unit may recognize the surrounding situation of the subject vehicle 101 based on information obtained through road-to-vehicle and vehicle-to-vehicle communications via the communication unit 1.

In the above embodiment, the path generation unit 112 generates an offset return path for the subject vehicle 101 so that the acceleration of the subject vehicle 101 in the vehicle width direction is equal to or less than a predetermined value. However, when generating the offset return path, the path generation unit may generate the offset return path for the subject vehicle 101 so that the yaw angular velocity of the subject vehicle 101 is equal to or less than a predetermined angular velocity or the yaw angular acceleration of the subject vehicle 101 is equal to or less than the predetermined angular acceleration.

Meanwhile, in a case where the relative speed (relative speed in the traveling direction) with the other vehicle 102 is large, for example, when the subject vehicle 101 passes at a high speed where the other vehicle 102 is stopped, it may increase anxiety to the occupant. In order to address such a problem, the path generation unit may determine whether the relative speed with the other vehicle 102 is greater than a predetermined threshold value; when the absolute value of the relative speed is equal to or less than the predetermined threshold value, the path generation unit may set the predetermined value to a first acceleration so that the movement amount of the subject vehicle 101 in the vehicle width direction (movement amount per unit time) is equal to or less than a first movement amount, while when the absolute value of the relative speed is greater than the predetermined threshold value, the path generation unit may set the predetermined value to a second acceleration smaller than the first acceleration so that the movement amount of the subject vehicle 101 in the vehicle width direction is a second movement amount, which is smaller than the first movement amount. As described above, in a case where the relative speed with respect to the other vehicle 102 is large, generating the offset return path so that the subject vehicle 101 has a smaller acceleration in the vehicle width direction when it returns from the offset driving, that is, the offset return path is longer, can reduce anxiety to the occupant as described above.

When generating the offset return path, the path generation unit may determine whether the relative distance from the other vehicle 102, or more specifically, whether the relative distance in the traveling direction at the point in time when the subject vehicle 101 returns to the position before the offset (center of the lane) from the offset driving (hereinafter referred to as the return point) is greater than a predetermined distance, and set the predetermined value to the first acceleration when the relative distance is longer than the predetermined distance, and set the predetermined value to the second acceleration smaller than the first acceleration when the relative distance is equal to or less than the predetermined distance. Specifically, the path generation unit first sets a predetermined value to the first acceleration and generates an offset return path so that the acceleration in the vehicle width direction when the subject vehicle 101 returns from the offset driving is equal to or less than the predetermined value (first acceleration). The path generation unit then predicts the relative distance to the other vehicle 102 at the return point when the subject vehicle 101 travels along the offset return path, based on the traveling position, traveling speed and others of the other vehicle 102. When the predicted relative distance is longer than the predetermined distance, the control unit controls the actuators AC so that the subject vehicle returns from the offset driving along the offset return path. On the other hand, when the predicted relative distance is equal to or less than the predetermined distance, the path generation unit updates the predetermined value with the second acceleration and re-generates the offset return path so that the acceleration in the vehicle width direction when the subject vehicle 101 returns from the offset driving is equal to or less than the predetermined value (second acceleration). The control unit controls the actuators AC so that the subject vehicle returns from the offset driving along the re-generated offset return path.

This allows the length of the offset return path (length in the front-back direction) to be adjusted according to the relative speed and relative distance of the other vehicle 102, thereby preventing the subject vehicle from approaching too much to the other vehicle 102 or setting an unnecessarily long offset driving path when returning from the offset driving.

The path generation unit may set the predetermined value to a value determined based on the attributes of the other vehicle 102. For example, the path generation unit may set the predetermined value smaller when the other vehicle 102 is a vehicle with a relatively large vehicle width (such as a truck or bus) than when the other vehicle 102 is a vehicle with a relatively small width (such as a motorcycle). That is, the larger the width of the other vehicle 102, the smaller the value may be set as the predetermined value. For example, the path generation unit may set a predetermined value based on the length of the other vehicle 102. Specifically, for example, the path generation unit may set the predetermined value smaller when the other vehicle 102 is a vehicle with a relatively large vehicle length than when the other vehicle 102 is a vehicle with a relatively small vehicle length. That is, the greater the vehicle length of the other vehicle 102, the smaller the value may be set as the predetermined value.

In the above embodiment, the path generation unit 112 offsets the driving path in a direction away from the other vehicle 102 so that the distance in the vehicle width direction from the other vehicle 102 is maintained at least a predetermined length. However, the path generation unit may offset the driving path in the vehicle width direction so that the distance in the vehicle width direction from the other vehicle 102 is at least the length determined based on the attributes of the other vehicle 102. For example, the target path may be generated so that the greater the width of the other vehicle 102, the greater the distance in the vehicle width direction from the other vehicle 102, that is, the driving path may be offset in the vehicle width direction. When the distance in the vehicle width direction from the other vehicle 102 is recognized to be greater than a predetermined length in step S1, the processing (steps S2 to S8) of offsetting the driving path of the subject vehicle 101 may not be executed.

When the other vehicle 102 accelerates while the subject vehicle 101 is passing by the side of the other vehicle 102 or after passing by, the subject vehicle 101 may approach or contact the other vehicle 102 if the subject vehicle 101 tries to return from the offset driving along the offset return path generated in step S4. Therefore, in order to solve this problem, the path generation unit may determine whether the relative speed with the other vehicle 102 is greater than a predetermined threshold during the offset driving. Similarly, the path generation unit may determine whether the relative distance to the other vehicle 102 is greater than a predetermined distance during the offset driving. This allows the subject vehicle to return from the offset driving without approaching and contacting the other vehicle 102, even if the other vehicle 102 accelerates during the offset driving. Similarly, when another vehicle approaches during the offset driving, the subject vehicle can return from the offset driving without approaching and contacting that vehicle.

Figure 8A:
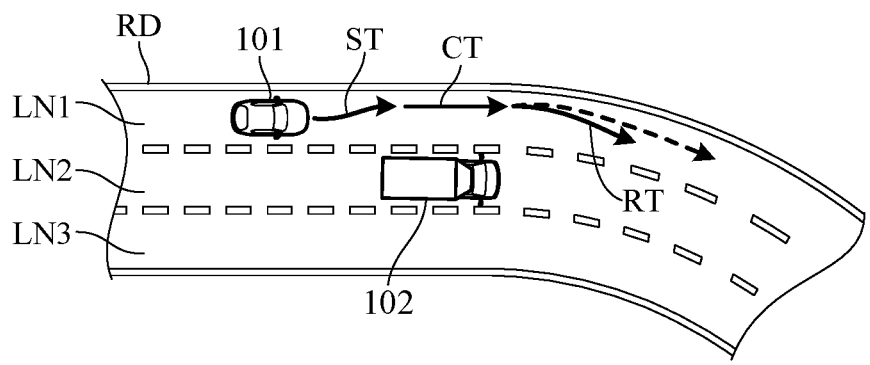
FIG. 8A is a diagram showing an example of a traveling scene in which a vehicle during the offset driving enters a curve road.

The length of the offset return path may be adjusted according to the structure of the road RD on which the subject vehicle 101 is traveling. FIG. 8A illustrates an example of a traveling scene in which the subject vehicle 101 during the offset driving enters a curve road. As illustrated in FIG. 8A, if the subject vehicle 101 enters the curve path with the driving path offset to the outside of the curve path (the top of the figure), the subject vehicle 101 may get out of the curve path. Therefore, in such a case, the path generation unit may shorten the offset return path generated in step S4 so that the subject vehicle 101 can return to the center of the lane as soon as possible. More specifically, the path generation unit may update the acceleration of the subject vehicle in the vehicle width direction to a larger value when returning from the offset driving. The dashed arrow in FIG. 8A represents the offset return path RT generated in step S4, and the solid arrow RT represents the updated offset return path.

Figure 8B:
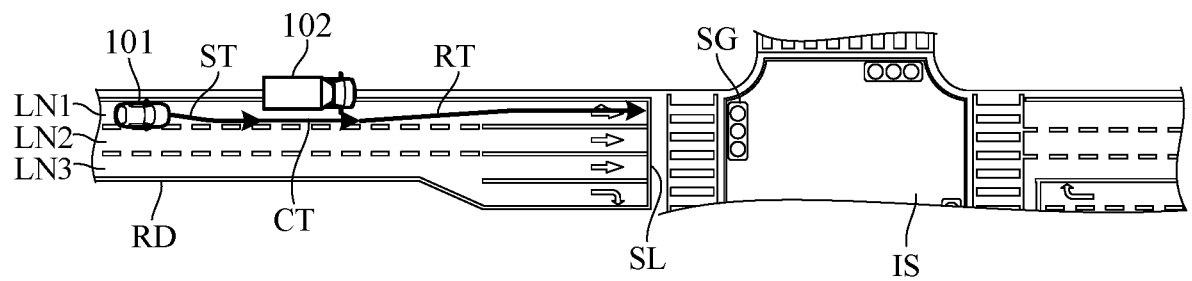
FIG. 8B is a diagram showing an example of a traveling scene with a stop line in front of a vehicle to be avoided.

Furthermore, the length of the offset return path may be adjusted according to road RD conditions. FIG. 8B illustrates an example of a traveling scene with a stop line in front of the avoidance target. As illustrated in FIG. 8B, when the intersection IS is in front of the other vehicle 102 to be avoided and a traffic signal SG is a stop signal, the subject vehicle 101 must stop at the stop line SL. At this time, if the subject vehicle 101 stops at the stop line SL while the driving path is still offset to the side of the adjacent lane (lane LN2), the occupant of the other vehicle in the adjacent lane may feel a pressure. Therefore, in such a case, the path generation unit may adjust the length of the offset return path so that the subject vehicle 101 returns to the center of the lane before the stop line SL. For example, the path generation unit may shorten the offset return path RT generated in step S4 when it is predicted that the subject vehicle will not be able to return to the center of the lane before the stop line SL based on the switching schedule information of the traffic signal SG obtained through roadside-to-vehicle or vehicle-to-vehicle communication via the communication unit 1. The switching schedule information is information that can identify the current display status of a traffic light and the timing for switching the display of a traffic light.

Furthermore, in the above embodiment, the shift to and return from the offset driving are executed with a movement amount that is unnoticeable to the occupant. Alternatively, in order to further reduce the discomfort to the occupant caused by the lateral shift of the subject vehicle 101, the occupant may be informed that the subject vehicle 101 will shift laterally. For example, the control unit may control a speaker (not illustrated) or display (not illustrated) installed in the vehicle to inform the occupant that the subject vehicle 101 will shift laterally at the start of the offset driving or when returning from the offset driving.

The above embodiment can be combined as desired with one or more of the above modifications. The modifications can also be combined with one another.

According to the present invention, it is possible to avoid approach to the object in the vehicle width direction without reducing the ride comfort of the occupant.

Above, while the present invention has been described with reference to the preferred embodiments thereof, it will be understood, by those skilled in the art, that various changes and modifications may be made thereto without departing from the scope of the appended claims.

What is claimed is:

1. A vehicle control apparatus comprising
a microprocessor and a memory coupled to the microprocessor, wherein
the microprocessor is configured to perform:
recognizing a surrounding situation of a subject vehicle;
generating a target path based on a recognition result in the recognizing;
controlling a traveling actuator so that the subject vehicle travels along the target path; and
predicting, when an object is recognized in a current lane in which the subject vehicle is traveling or in an adjacent lane adjacent to the current lane, whether a passing run in which either the subject vehicle or the object passes by a side of the other one, occurs based on a relative speed of the subject vehicle to the object, wherein
the microprocessor is configured to perform
the generating including, when the passing run in which the subject vehicle passes by the side of the object from behind is predicted to occur, generating the target path so that the subject vehicle executes an offset driving in which the subject vehicle is offset in a vehicle width direction relative to the object,
the predicting including further predicting whether the subject vehicle enters an intersection while the subject vehicle is returning from the offset driving, and
the generating including, when it is predicted that the subject vehicle enters the intersection while the subject vehicle is returning from the offset driving, generating the target path so that the acceleration in the vehicle width direction when the subject vehicle returns from the offset driving is equal to or less than a predetermined value.

2. The vehicle control apparatus according to claim 1, wherein
the predetermined value is set to a value smaller than a discrimination threshold at which an occupant can sense a movement of the subject vehicle in the vehicle width direction.

3. The vehicle control apparatus according to claim 1, wherein
the microprocessor is configured to perform
the generating including determining whether the relative speed with the object is greater than a predetermined threshold value, setting the predetermined value to a first acceleration when an absolute value of the relative speed is equal to or less than the predetermined threshold value, and setting the predetermined value to a second acceleration smaller than the first acceleration when the absolute value of the relative speed is greater than the predetermined threshold value.

4. The vehicle control apparatus according to claim 1, wherein the microprocessor is configured to perform the generating including determining whether a relative distance from the object is greater than a predetermined distance, setting the predetermined value to a first acceleration when the relative distance is longer than the predetermined distance, and setting the predetermined value to a second acceleration smaller than the first acceleration when the relative distance is equal to or less than the predetermined distance.

5. The vehicle control apparatus according to claim 1, wherein the microprocessor is configured to perform the generating including setting the predetermined value to a value determined based on an attribute of the object.

6. The vehicle control apparatus according to claim 5, wherein the attribute of the object is a vehicle length when the object is a vehicle, and the microprocessor is configured to perform the generating including setting the predetermined value to a smaller value, the greater the vehicle length of the object.

7. The vehicle control apparatus according to claim 5, wherein the attribute of the object is a vehicle width when the object is a vehicle, and the microprocessor is configured to perform the generating including generating the target path so that a distance in the vehicle width direction from the object is longer, the greater the vehicle width of the object.

8. A vehicle control apparatus comprising a microprocessor and a memory coupled to the microprocessor, wherein the microprocessor is configured to perform:

recognizing a surrounding situation of a subject vehicle;

generating a target path based on a recognition result in the recognizing;

controlling a traveling actuator so that the subject vehicle travels along the target path; and predicting, when an object is recognized in a current lane in which the subject vehicle is traveling or in an adjacent lane adjacent to the current lane, whether a passing run in which either the subject vehicle or the object passes by a side of the other one occurs based on a relative speed of the subject vehicle to the object, wherein the microprocessor is configured to perform the generating including, when the passing run in which the object passes by the side of the subject vehicle from behind is predicted to occur, generating the target path so that the subject vehicle executes an offset driving in which the subject vehicle is offset in a vehicle width direction relative to the object.

9. The vehicle control apparatus according to claim 8, wherein the microprocessor is configured to perform the predicting including predicting whether the subject vehicle enters an intersection while the subject vehicle is shifting to the offset driving, and the generating including, when it is predicted that the subject vehicle enters the intersection while the subject vehicle is shifting to the offset driving, generating the target path so that an acceleration in the vehicle width direction when the subject vehicle shifts to the offset driving is equal to or less than a predetermined value.

10. A vehicle control apparatus comprising a microprocessor and a memory coupled to the microprocessor, wherein the microprocessor is configured to perform:

recognizing a surrounding situation of a subject vehicle;

generating a target path based on a recognition result in the recognizing;

controlling a traveling actuator so that the subject vehicle travels along the target path; and predicting, when an object is recognized in a current lane in which the subject vehicle is traveling or in an adjacent lane adjacent to the current lane, whether a passing run in which either the subject vehicle or the object passes by a side of the other one occurs based on a relative speed of the subject vehicle to the object, wherein the microprocessor is configured to perform the generating including, when the passing run is predicted to occur, generating the target path so that the subject vehicle executes an offset driving in which the subject vehicle is offset in a vehicle width direction relative to the object, and the predicting including further predicting whether the subject vehicle enters an intersection during the offset driving and turns at the intersection in a same direction as an offset direction of the offset driving, and the generating including, when it is predicted that the subject vehicle turns at the intersection in the same direction as the offset direction of the offset driving, generating the target path so that the offset driving continues to the intersection.

\* \* \* \* \*